Patented Nov. 18, 1941

2,263,550

UNITED STATES PATENT OFFICE 2,263,550

PROCESS FOR PREPARATION OF VITAMIN E CONCENTRATE AND ANTIOXIDANT

John S. Andrews, St. Paul, Minn., assignor to General Mills, Inc., a corporation of Delaware No Drawing. Application July 18, 1938,
Serial No. 219,896

8 Claims. (Cl. 167—81)

The present invention relates to a process for separating the non-saponifiable matter from fats and oils and more particularly to the preparation of stable, fat-free concentrates of vitamin E and the natural antioxidants from vegetable oils such as wheat germ oil, corn oil, and cottonseed oil.

The principal object of my invention is to provide an effective and economical process of treating vitamin E and antioxidant containing oils in such a manner as to permit removal of the non-saponifiable matter and at the same time effect this removal without oxidative destruction of the vitamin E or natural antioxidant.

Another object of my invention is to remove a major portion of fatty glycerides present in vegetable oils, such as wheat germ oil, by esterifying the glycerides which constitute the major portion of the oils and then vacuum distilling the more volatile esters, the distillation process separating the fatty material from the residue containing vitamin E and antioxidants.

A further object of my invention is to provide an effective method of treating vegetable oils to produce vitamin E therefrom which permits recovery of the glycerol content of the vegetable oils since the glycerol liberated from the glycerides by methylation is insoluble in methyl esters formed by the methylation and may be separated from such esters after excess methyl alcohol has been distilled off.

A still further object of my invention is to recover about half of the sterol content of wheat germ oil by crystallization of the sterols from methyl esters formed by methylating the glycerides of the wheat germ oil. The sterols are relatively insoluble in the cold methyl esters and upon chilling these esters, a considerable portion of the sterols naturally occurring in wheat germ oil, separate as crystals of high purity.

These and other objects and advantages of my invention will be more readily apparent from a consideration of the following detailed specification in conjunction with the appended claims.

It has heretofore been customary to prepare certain forms of vitamin concentrates by saponifying an oil, such as fish oil, with alkali in alcoholic solution. This resulted in the formation of a soap solution which was extracted with a solvent in which the soap is insoluble. The resulting extract contains the non-saponifiable matter including the vitamins. Because the glycerides, in many instances constitute more than 95% of the oil, large amounts of alkali and extraction solvents were required. This extraction process, however, also renders the vitamins susceptible to oxidation by exposure to the atmosphere. This factor has led certain investigators in this field to carry out their extraction process in an inert atmosphere, such as in nitrogen or illuminating gas.

My invention is based upon the discovery that the above-mentioned difficulties may be obviated and that a satisfactory biologically active vitamin E concentrate and antioxidant may be produced by a process which comprises first substituting the glycerol portion of the glycerides in the wheat germ oil or other vitamin E containing oil, with some other alcohol in order to produce esters of lower boiling point than that of the original glycerides. Then distilling off the bulk of the fatty material to produce a vitamin E containing residue. This residue may be further concentrated by saponifying it with alkali and then extracting the resulting product with ether, chloroform, ethylene dichloride, or other suitable solvents.

As an alternative to the saponification and extraction process, the residue from the distillation of the esters may be saponified and the resultant product converted to the calcium soaps from which the vitamin E and antioxidant concentrate may be obtained by extraction with acetone.

The esterification reaction, which is the first step in my process may be represented by the following equation:

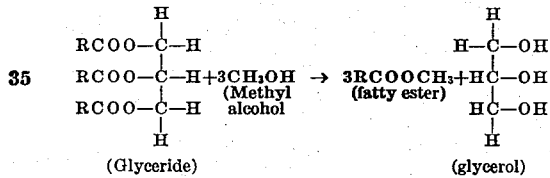

The saponification of the fatty esters produced above, may be represented by the following equation which shows the formation of both the alkali and an alkaline earth soap:

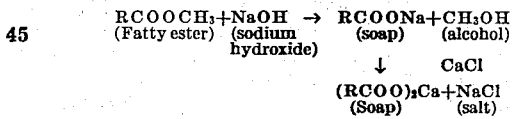

The following specific examples will serve to illustrate and explain my invention: Approximately 700 grams of absolute methanol containing 2%, by weight, of dry hydrogen chloride (as a catalyst) is heated to boiling under a reflux condenser and 350 grams of wheat germ oil is slowly added with stirring. Gentle boiling is continued for 20 hours or until the reaction mixture becomes homogeneous. The excess methanol is distilled off, the residue cooled, and the top thin layer of crude esters is decanted from the lower viscous layer of crude glycerol. Crude esters, containing vitamin E, are washed free of hydrogen chloride and methanol with a strong, hot salt solution, and then chilled to 0° to 5° C. for 24 hours thereby causing separation of sterols. Crystalline sterols amounting to about 2%, by weight, of the wheat germ oil are filtered off. The filtered esters are then distilled in a high vacuum, approximately 90% to 95% distilling over between 131° C. to 168° C. at a pressure of less than 1 m. m. Bioassay of the residue shows vitamin E activity which represents an 18-fold concentration over the original wheat germ oil.

20 grams of the residue from the above distillation is added to a boiling solution of 2.5 grams of 95% sodium hydroxide in 10 cubic centimeters of water and 70 cubic centimeters of methanol. The mixture is refluxed a half hour and then diluted to 500 cubic centimeters with hot water. Then, with vigorous stirring, a solution of 3.4 grams of calcium chloride dissolved in 75 cubic centimeters of water is added and a fine precipitate is formed. The fine, flocculent precipitate of a calcium soap is filtered by suction, and then extracted several times with acetone. The acetone extract, containing vitamin E, and amounting to about 600 cubic centimeters is cooled overnight in a refrigerator. As a result of this cooling, sterols crystallize out of solution. The sterols are removed by filtration and the acetone and water removed by distillation.

If desired, the product obtained above may be further purified by extracting the residue several times with petroleum ether and the extract chilled overnight. The sterols are filtered off and the filtrate evaporated to dryness. The product is a thick red oil (containing vitamin E) weighing 5.74 grams and equivalent to 28.7% of the original methyl ester distillation residue. This is equivalent to 1.6% of the original wheat germ oil. Bioassay shows the material to have an activity of sixty times the potency of the wheat germ oil from which it was derived. This is essentially a quantitative concentration of the vitamin E principle.

Instead of distilling the methyl esters prior to saponification, saponification may be carried out directly, as in the following example. 68 grams of crude methyl esters (derived by methylation of wheat germ oil) are saponified with 12 grams of sodium hydroxide dissolved in 20 cubic centimeters of water and 95 cubic centimeters of methanol, as in the preceding example. The resultant soap is dissolved in 3 liters of hot water and precipitated with 16.5 grams of calcium chloride. The aqueous solution is decanted from the gummy precipitate, which, upon cooling, becomes brittle. This precipitate is broken up to approximately 10 mesh size and extracted several times with acetone. The combined extracts are evaporated and the resultant waxy solid dissolved in petroleum ether. After standing in the cold overnight, the solution is filtered from the sterol and evaporated to dryness. The product weighs 1.68 grams and represents 2.47%, by weight, of the original esters. Bioassay shows this viscous oil to have a biological activity of 37.5 times the potency of the original esters.

While in the specific examples given above, methyl alcohol has been used for the methylation of wheat germ oil, it will be understood, that esterification can be effected by the use of ethyl or propyl alcohols. However, as the methyl esters have boiling points which are lower than esters produced by the use of the other alcohols, it will be understood that I prefer to use methyl alcohol for the esterification.

Concentrates produced by my invention have antioxidant properties and when added to fats, such as animal and vegetable fats, they delay the development of rancidity therein.

While the invention has been described in detail with specific examples, such examples are illustrative and are not given as limitations, since other modifications within the spirit and scope of the invention will be apparent to those skilled in the art. Hence, the invention is to be understood as limited only as indicated in the appended claims, in which the intent is to set forth all the novelty over the prior art.

I claim as my invention:

1. A process of preparing a concentrate of naturally occurring vitamin E and antioxidant from wheat germ oil which comprises esterifying the oil by treating it with a monohydric alcohol selected from a group consisting of methyl, ethyl and propyl alcohols containing hydrogen chloride as a catalyst, separating the crude glycerol and sterols therefrom after distilling off the excess alcohol, and then vacuum distilling the crude esters resulting from the aforesaid esterification thereby producing a residue rich in vitamin E and in antioxidant.

2. The process of producing vitamin E concentrate from wheat germ oil containing glycerides comprising completely substituting the glycerol portion of the glycerides in the oil with a monohydric alcohol selected from the group consisting of methyl, ethyl and propyl alcohols whereby esters of low boiling point are produced, and separating a substantial portion of said esters from said vitamin E.

3. The process of producing vitamin E concentrate from wheat germ oil containing glycerides comprising completely converting the glycerides to methyl esters by treating said oil with methyl alcohol containing hydrogen chloride as a catalyst, and separating a substantial portion of said esters from said vitamin E.

4. A process of producing a concentrate of naturally occurring vitamin E and antioxidant from wheat germ oil which comprises esterifying the oil by treating it with a monohydric alcohol selected from the group consisting of methyl, ethyl and propyl alcohols containing hydrogen chloride as a catalyst, separating the crude glycerol and sterols therefrom after distilling off the excess alcohol, and then saponifying the esters obtained from treating the oil with alcohol and hydrogen chloride, by treating the esters with an alcoholic solution of alkali and then extracting the resultant soap solution to remove non-saponifiable vitamin E containing material therefrom whereby a concentrate rich in vitamin E is obtained.

5. A process of producing a concentrate of naturally occurring vitamin E and antioxidant from wheat germ oil which comprises esterifying the oil by treating it with a monohydric alcohol selected from the group consisting of methyl, ethyl and propyl alcohols containing hydrogen chloride as a catalyst, separating the crude glycerol and sterols therefrom after distilling off the excess alcohol, and then saponifying the esters obtained from treating the oil with alcohol and hydrogen chloride, by treating the esters with an alcoholic solution of alkali thereby obtaining a soap solution, then treating said soap solution with an aqueous solution of calcium chloride thereby forming a calcium soap precipitate, removing said precipitate by filtration, and then extracting the soap with acetone to obtain the non-saponifiable matter which is rich in vitamin E.

6. A process as defined in claim 5, in which the esters are subjected to vacuum distillation and the residue is saponified with alkali.

7. A process as defined in claim 4, in which the esters are subjected to vacuum distillation and the residue is saponified with alkali.

8. A process of producing vitamin E concentrate and antioxidant from glyceride oils containing the same which comprises converting said glycerides to low boiling point esters by treating said oil with a monohydric alcohol selected from the group consisting of methyl, ethyl and propyl alcohols, and separating a substantial portion of said esters from said vitamin E antioxidant.

JOHN S. ANDREWS.